(12) United States Patent
Buettner et al.

(10) Patent No.: US 6,353,730 B1
(45) Date of Patent: Mar. 5, 2002

(54) AUTOMATIC CALL TO PAGE CONVERSION IN A RADIO COMMUNICATION SYSTEM

(75) Inventors: Nathan Andrew Buettner, Lewisville; George Christian Alford, Plano, both of TX (US)

(73) Assignee: Uniden America Corporation, Forth Worth, TX (US)

( * ) Notice: Subject to any disclaimer, the term of this patent is extended or adjusted under 35 U.S.C. 154(b) by 0 days.

(21) Appl. No.: 09/103,402

(22) Filed: Jun. 24, 1998

(51) Int. Cl.[7] .............................. H04B 1/56; H04M 1/56; H04Q 7/28
(52) U.S. Cl. ............... 455/38.3; 455/31.1; 455/518; 455/519; 340/825.44; 340/825.22
(58) Field of Search ................. 455/518, 519, 455/520, 38.3, 31.1; 340/825.44, 825.22; 370/311

(56) References Cited

U.S. PATENT DOCUMENTS

| | | | |
|---|---|---|---|
| 5,063,588 A | 11/1991 | Patsiokas et al. | 379/57 |
| 5,115,223 A | 5/1992 | Moody | 340/573 |
| 5,369,681 A * | 11/1994 | Boudreau et al. | 455/456 |
| 5,459,458 A | 10/1995 | Richardson et al. | 340/825.52 |
| 5,557,605 A | 9/1996 | Grube et al. | 370/29 |
| 5,559,860 A | 9/1996 | Mizikovsky | 379/58 |
| 5,722,067 A | 2/1998 | Fougnies et al. | 455/406 |
| 5,764,730 A | 6/1998 | Rabe et al. | 379/58 |
| 5,809,428 A * | 9/1998 | Garahi et al. | 455/517 |
| 5,845,211 A | 12/1998 | Roach, Jr. | 455/436 |
| 5,857,016 A * | 1/1999 | Jedlicka | 379/142 |
| 5,873,031 A * | 2/1999 | Griffith et al. | 455/412 |
| 5,924,044 A | 7/1999 | Vannatta et al. | 455/556 |
| 6,005,928 A * | 12/1999 | Johnson | 379/142 |
| 6,018,668 A | 1/2000 | Schmidt | 455/518 |

* cited by examiner

Primary Examiner—Daniel Hunter
Assistant Examiner—Alan T. Gantt
(74) Attorney, Agent, or Firm—Fulbright & Jaworski L.L.P.

(57) ABSTRACT

A radio communication network is disclosed, wherein direct calls are automatically converted to pages when the called radio is not in radio frequency (RF) communication with any of the cells of the radio system. The called radio's current checked-in cell sends call set up messages to the called radio. If the called radio does not respond, then the incoming call is automatically converted to a page that is delivered to the called radio when it checks back into the system. Any appropriate network element, such as the calling radio, the calling or called radio's checked-in cell, or the called radio's home cell, may configure the page.

28 Claims, 2 Drawing Sheets

AUTOMATIC CALL TO PAGE CONVERSION IN A RADIO COMMUNICATION SYSTEM

RELATED APPLICATIONS

The present invention is related to pending application Ser. No. 09/103,698, entitled CALLER IDENTIFICATION IN A RADIO COMMUNICATION SYSTEM, filed concurrently herewith, the disclosure of which is hereby incorporated by reference herein.

TECHNICAL FIELD OF THE INVENTION

The present invention is related to radio communication systems and, more particularly, to a system and method for automatically converting unanswered calls to pages in a mobile radio communications system having one or more cells.

BACKGROUND OF THE INVENTION

Radio communications systems, such as the multi-site trunked land mobile radio system which is described herein as an illustrative example, typically comprise one or more base stations which function as repeaters between mobile radio units. The radio units communicate in a direct call mode or a group call mode. In a direct call, one radio communicates directly with another radio through the repeater base station. In a group call, one radio can communicate with a plurality of radios in a designated group. The radio units transmit on one frequency and receive on a different frequency. The base stations act as a repeater between a sending radio and a receiving radio by receiving signals on the sending radio's transmit frequency and re-transmitting the signals on the receiving radio's receive frequency. Such a system is disclosed in U.S. Pat. No. 5,613,201, entitled AUTOMATIC CALL DESTINATION/SYSTEM SELECTION IN A RADIO COMMUNICATION SYSTEM, the disclosure of which is hereby incorporated by reference herein.

The base stations serve a specific geographic area, or cell, and each radio unit is assigned to a specific home cell. The cells may be linked together to cover a large area by linking the base stations so that they can exchange data and transmission signals. This multiple cell arrangement allows two or more radios to communicate even if they are not in communication with the same cell or repeater. The cells monitor each assigned radio by tracking which cell is communicating with the radio. Also, each cell maintains a list of all the radios that are communicating with the base station, regardless of whether the radios are assigned to that cell or not.

When a radio unit initiates a call, the base stations perform call set up functions by determining if the called radio is checked into that cell and then exchanging call set up messages with the called radio. If the called radio is not within the originating cell, then the system determines where the called radio is located and the call information is routed to the called radio's current cell, which exchanges the call set up messages with the called radio. When a radio is outside the RF coverage area of the cells, or when a radio is turned off, the incoming calls cannot be completed to the called radio. As a result, the called party will not receive the incoming calls.

In the prior art, the caller has only two options when the called radio does not respond to an incoming call. On one hand, the caller can continue to call the destination radio periodically with the expectation that the called unit will eventually either be moved back into the system's coverage area or be turned on so that it can receive calls. Alternatively, the system may allow the caller to leave a page or message for the called radio. The page will then be delivered when the called radio checks into the system and the called party will be notified of a missed call. The prior art methods of handling missed calls require additional effort by the caller, such as continuing to initiate the call or manually configuring a page message. In the prior art, the caller must select the page function manually and then he or she must set up the page using the radio's keypad by entering codes, such as the called and calling radio unique identification codes.

It is an object of the present invention to provide a system and method for automatically setting up and configuring a page message when a called radio does not answer an incoming call.

SUMMARY OF THE INVENTION

The illustrative system described herein addresses the limitations of the prior art radio communications systems by automatically configuring a page message when a called radio does not respond to an initial call set up message. After determining the called radio's checked-in cell, the base station for that cell sends an initial message to the radio, such as a "hey you" message. In response, the called radio transmits a corresponding answer to the base station, such as a "what" message. However, if the called radio is turned off or outside the coverage area for the cells, then the radio will not receive the initial "hey you" message and will not respond with the appropriate "what" message.

When the cell determines that the called radio is not answering, it sends a notification to the calling radio that the called unit is not available. In the present example, the radio communication system automatically configures a page for the called radio. The page will be delivered when the called radio checks back in with one of the cells.

The automatic page set up function may be performed by the calling radio's cell, the called radio's home or current cell, or even the calling radio itself Depending upon which device initiates the page, additional information may have to be provided so that the page can be configured properly. For example, if the called radio's home or current cells configure the page, then they must receive additional information that identifies the calling radio, such as a source identifier.

If the called radio is within the system, then caller identification information may be sent to the called radio as described in co-pending application Ser. No. 09/103,698, entitled CALLER IDENTIFICATION IN A RADIO COMMUNICATION SYSTEM, the disclosure of which is hereby incorporated by reference herein.

It is a feature of the invention to detect when a call in a radio communication system is not answered and to automatically configure a page or message for the called radio to notify the called user that there has been a missed call. The system sends the page to the called radio when the radio checks back into one of the system's cells.

It is another feature of the present invention to send information that identifies the calling radio so that a page can automatically be configured by the called radio's home cell or its checked-in cell. The source identification data may be sent along with the initial call set up message from the calling radio. Alternatively, the calling radio may provide the source data after receiving notification that the called party has not answered the call.

It is an additional feature of the invention to provide a system in which the cell serving the calling radio, or the calling radio itself, has the capability to automatically configure the page upon notification that the called radio is not answering the call.

In another embodiment of the present invention, the radio communication system is capable of automatically configuring page messages for individual radios in a calling group when those radios are not in communication with the system during a group call. The group call page message may indicate the calling radio, the group that was called or both. This would allow the called radio user to determine what type of call had been missed.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
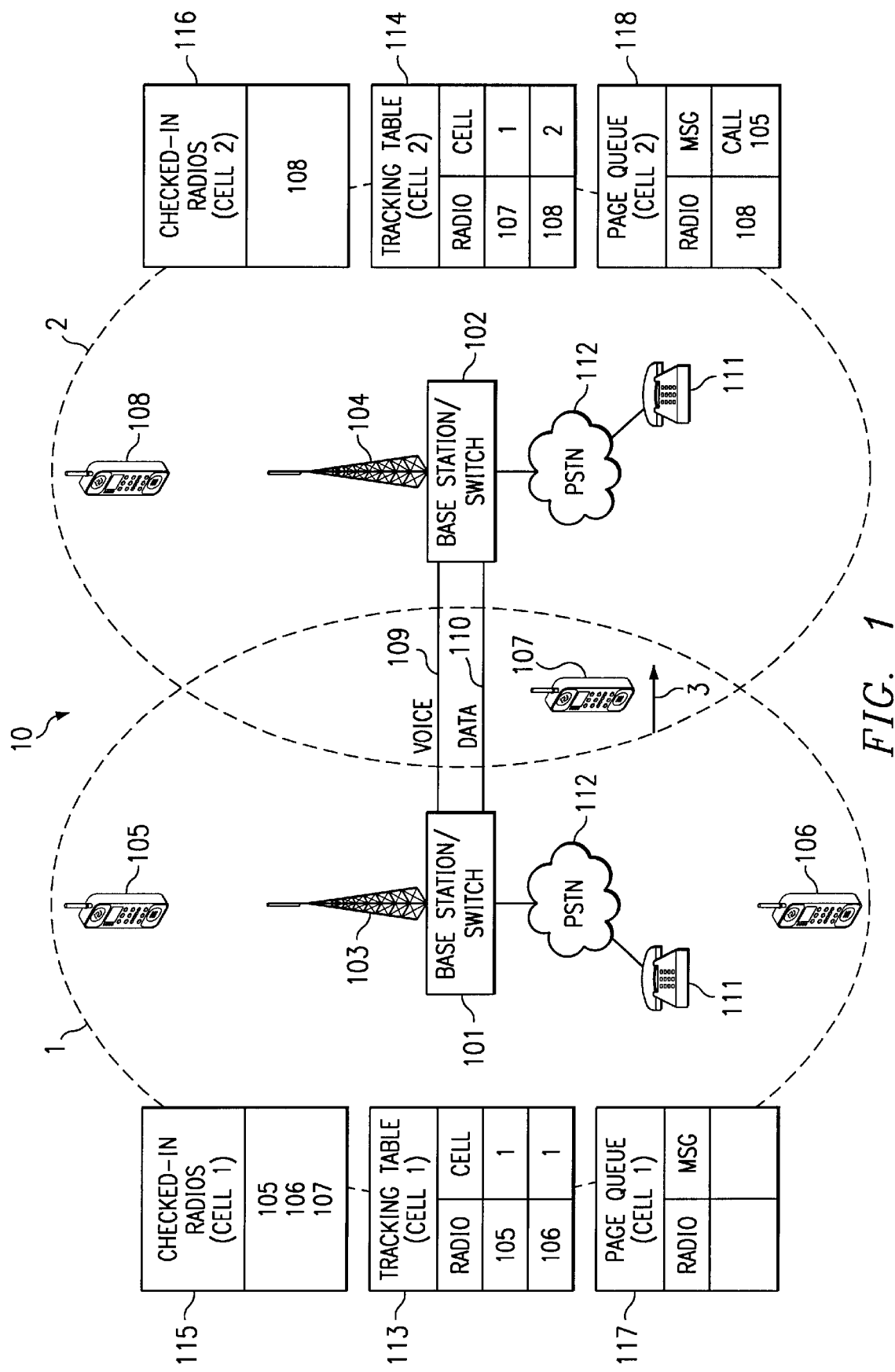
FIG. 1 is a block diagram of a radio communication system incorporating the present invention.

FIG. 1 illustrates a trunked mobile radio system 10 having base stations 101 and 102, which are coupled to antennas 103 and 104 respectively. Base stations, or switches, 101 and 102 are in radio frequency (RF) communication with radios 105–108, which may be hand-held, mobile or other types of radios. Usually, base stations 101 and 102 function as repeaters wherein signals are received from radios 105–108 on one frequency and retransmitted on a different frequency. Typically, the receive and transmit frequencies are paired as a distinct channel. Base stations 101 and 102 are capable of communicating over a number of such channels. Base stations 101, 102 and radios 105–108 may operate in any frequency band, such as in an 800 MHZ trunked mobile radio frequency band or in the UHF or VHF bands. Frequency selection is limited solely by the frequency bands assigned for use by the Federal Communications Commission (FCC).

Base stations 101 and 102 each serve a particular geographic area or cell, for example cell 1 is served by base station 101 and cell 2 is served by base station 102. The size of the cells is dependent upon the signal power that is produced by base stations 101, 102, the height of antennas 103, 104 and various environmental factors, such as the presence of natural or man-made signal obstructions. Depending upon the size of the area to be covered, a single base station cell may cover a sufficient region or, as illustrated in FIG. 1, a number of base stations can be linked together to cover a broader area. Base stations 101 and 102 are connected via voice link 109 and data link 110. Links 109 and 110 may be embodied as any connection that allows voice or data communications. The connection between base stations 101 and 102 over links 109 and 110 may be continuous, such as via a dedicated telephone trunk, or it may be a dial-up connection, such as a modem, which provides communication between the base stations only when required.

In system 10, radios may communicate in either a one-to-one or a one-to-many mode. For example, using base station 101 as a repeater, radio 105 can make a direct call to a single radio, such as radio 106, or radio 105 may communicate simultaneously with a group of radios. Communication links 109 and 110 allow base stations 101 and 102 to exchange signals and information for both direct and group calls. This enable two or more radios to communicate even though they are served by different base stations in different cells. For example, radio 105 can communicate with radio 108 even though radio 105 is in communication with base station 101 in cell 1 and radio 108 is in communication with base station 102 in cell 2. Base stations 101 and 102 exchange the signals from radios 105 and 108 over links 109 and 110. Link 110 is used to exchange tracking information and page data, which will be discussed in more detail below. Once a call has been established between two radios in different cells, such as between radios 105 and 108, then the voice transmission signals are exchanged over voice link 109.

In addition to providing a communication link between two or more radios, base stations 101 and 102 provide communication between radios 105–108 and telephone 111. Base stations 101 and 102 are coupled to public switched telephone network (PSTN) 112. Radios 105–108 have a numeric keypad which allows users to enter telephone number information. When base station 101 or 102 detects that a radio has initiated a call to PSTN 112, the base station uses the telephone number information and connects to the appropriate telephone 111. Alternatively, switches 101 and 102 may route incoming calls from telephone 111 to radios 105–108.

Radios 105–108 are each assigned to a particular home base station or cell. Each cell maintains a tracking table, such as table 113 for base station 101 and table 114 for base station 102. Tracking tables 113 and 114 indicate where each assigned radio is checked in. The checked in cell is the cell that is currently in RF communication with the radio. Table 113 shows that radios 105 and 106 are assigned to cell 1 and both are currently checked in to cell 1. On the other hand, table 114 shows that radios 107 and 108 are assigned to cell 2, but only radio 108 is checked into cell 2. Radio 107 is checked-in with cell 1.

Tables 113 and 114 are updated every time a radio checks into a new cell. Radios switch from one cell to another as they change locations. When radios 105–108 move out of a cell and can no longer communicate with a cell, the radios begin a search function to determine if the radio is within another cell. If another cell is detected, then the radio checks in with that new cell. For example, if radio 107 is moving East, as shown by arrow 3, it will eventually move out of the range of base station 101 and out of cell 1. When radio 107 moves out of cell 1 it will begin a search to determine if it is within the coverage of any other cell. In FIG. 1, as radio 107 moves out of cell 1, it moves into cell 2. Therefore, when RF communication with base station 101 is lost, radio 107 will ideally search out, detect and check in with base station 102 in cell 2.

When radio 107 checks in with cell 2, base station 102 updates tracking table 114 to indicate that the current cell for radio 107 is cell 2. In this example, radio 107 is assigned cell 2 as the home cell, therefore cell 2 maintains the tracking table for radio 107. If, on the other hand, radio 107 was assigned to cell 1 as the home cell, then base station 102 would inform base station 101, via link 110, that radio 107 had checked in to cell 2. Each cell also maintains a list, 115 and 116, of radios that are currently checked into that cell.

Radios 105–108 are each assigned a unique identification code which identifies each radio and its home cell. In order to initiate a direct call between two radios, the caller enters the called radio's identifier. The unique radio identifier is used to initiate communications between the radios. For example, in a direct call between radio 105 and radio 108, the caller enters radio 108's identifier on the keypad of radio 105. This information is transmitted to base station 101, which uses table 115 to determine if radio 108 is currently checked in to cell 1. Since radio 108 is not checked-in to cell 1, base station 101 contacts the home cell for radio 108. Switch 101 can determine which cell is radio 108's home cell from radio 108's unique identifier. In this example, cell 2 is the home for radio 108. Switch 101 contacts switch 102 via link 110 and queries cell 2 as to where radio 108 is currently checked-in. After determining where radio 108 is checked in, base station 101 then sends the direct call request to that cell, in this case cell 2. Cell 2 then sends call setup messages to radio 108 to complete the direct call. If radio 108 is still in communication with cell 2, a direct call connection is established between radios 105 and 108 via cells 1 and 2 over links 109 and 110.

In the situation where radio 108 moves outside the RF coverage area for cells 1 and 2, a direct call cannot be established since radio 108 is not in RF communication with either base station. In this case, system 10 notifies the caller that the called party is unavailable. Typically, system 10 will play a voice message asking the caller whether he or she desires to leave a message or page for the called party. The caller can enter a page for radio 108, such as the identifier for radio 105. Each base station has a page queue, 117 and 118, which holds the page information for radios that are not checked-in to system 10. The pages are held by system 10 until the radio checks-in and then the page is delivered. The page may be delivered as a text message that is displayed on the radio or some other indication may be used to prompt the user to retrieve the page.

Continuing with the example used above, eventually radio 108 will again check-in with one of the base stations, 101 or 102, in system 10. At that time, the base station that checks-in radio 108 will update the appropriate checked-in radio list, 115 or 116, and notify radio 108's home cell, 2, that radio 108 has checked-in. Cell 2 then updates tracking table 114 to indicate where radio 108 has checked-in. Also, base station 102 checks page queue 118 and sends all pending pages to radio 108.

In the present example, instead of prompting the caller to enter a page, system 10 automatically configures pages when a called radio is not available or out of range. In the case where the called and the calling radios are both checked-in on the same home cell, or in a single cell system, the system operates as follows. The calling radio attempts to direct call the called radio. Upon receiving the direct call request from the calling radio, the base station or switch for the cell sends a call set up command, such as a "hey you" command, to the called radio. If a corresponding response, such as a "what" command, is not received from the called radio, then the switch assumes that the called radio is turned off or out of range. The switch then converts the direct call request into a page and puts the page into the system page queue. The source identifier for the direct call request tells the switch which radio has initiated the direct call. The source information is used to configure the page message. All items in the system page queue are delivered when the called radio checks back into the system, even if the called radio checks in with a different cell.

Figure 2:
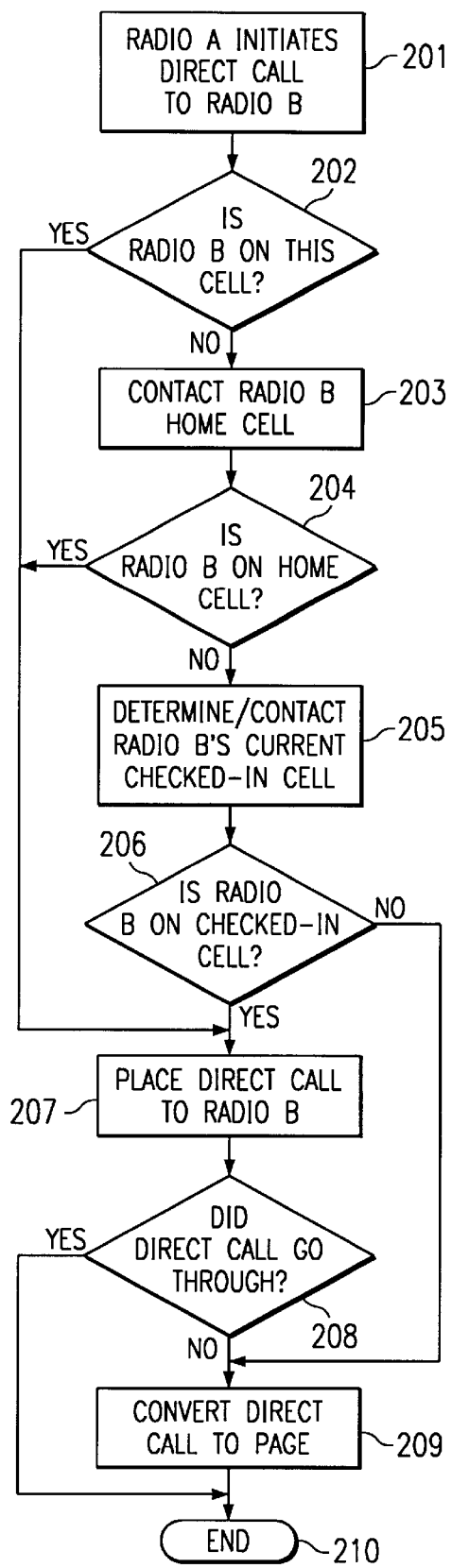
FIG. 2 is a flowchart illustrating the steps that are followed in the present invention to send a direct call page.

For the case where the called and calling radios are not on the same cell, the operation of the automatic page system is illustrated by flowchart 200 of FIG. 2. In step 201, the caller, radio A, attempts to direct-call called radio, radio B. Upon receiving the direct call request, radio A's switch makes a determination, in step 202, whether called radio B is checked into the same cell as radio A using the list of locally checked-in radios. If radio B is checked-in on the same cell, then the direct call is placed to radio B as shown in step 207. On the other hand, if radio B is not checked into the same cell, then radio A's switch contacts radio B's home cell in step 203. Radio A's switch determines radio B's home cell from the unique identifier assigned to radio B, which includes a home cell identifier. Radio A's switch sends the calling and called radio identifiers to radio B's home cell. The direct call information is passed between cells via a telephone line or some other data connection.

In step 204, radio B's home cell determines whether radio B is checked in on the home cell. If radio B is checked in on the home cell, then a direct call is placed in step 207. However, if radio B is not checked in on the home cell, then, in step 205, radio B's home cell determines which cell has checked in radio B. As discussed above, every time a new radio checks into a cell, the cell updates the tracking table on the radio's home cell. This tracking table is used to locate the radio to route call requests. The direct call request and radio identifiers are then sent to the appropriate checked in cell via a telephone or data link. At step 206, radio B's current cell determines if the radio is still checked in. If radio B is still checked in with that cell, then a direct call is placed in step 207. However, if radio P is not checked-in on that cell, then a page is automatically configured in step 209.

The appropriate cell that is in communication with radio B places the direct calls in step 207. This is accomplished in the same manner as describe above, wherein the switch transmits a call set up command, such as a "hey you," and the radio responds with a "what" command. In step 208 the switch determines whether the call went through between radios A and B. If the call connection was successful, then the direct dial program ends in step 210.

When the system is unable to contact radio B to establish the direct call, a page is configured in step 209. The system stores the direct call request and the calling radio's identifier as the page message in the page queue. The direct call program ends in step 210 and the system waits for radio B to check back into the system and then delivers the pending pages at that time.

Once radio B checks in with a cell, the user may be notified of the page by an audible alert tone, a flashing indicator light or some other visual or audio notification.

The user may receive pages in any number of ways, such as by selecting a particular menu display or by listening to a system generated message. It will be understood that the page can be formatted in various configurations depending upon the information to be provided. Furthermore, the user may have several options regarding how to respond to the page, such as storing or deleting the page message or automatically initiating a call back to the original caller.

It will be understood that the present system may be configured to operate with one or many cells, switches or base stations. Furthermore, the automatic page configuration function may be performed by any element in the network, such as by the caller's originating switch, the called radio's home switch or any other switch or base station that attempts to route the direct call. The system may also allow the users to configure the automatic page function so that only calls from certain calling radios are converted into a page.

Additionally, the automatic paging function may be used with group calling features. In a group call, one calling radio transmits to a number of called radios. The automatic page configuration system may be used to set up a page for those radios in the called group which were not checked into the system at the time of the group call. This would allow the caller to make a group transmission without having to verify which members of the group were not checked in. The system would convert the group call into a page only for those radios that did not receive the call. Users could also configure this function. For example, callers could select whether certain group calls should be converted to a page on a call-by-call basis. On the other hand, users could configure the system so that group calls to their radios were automatically converted to a page only for certain callers or calling radios.

In an alternative embodiment, switches 101 and 102 may be capable of receiving automatic number information (ANI) for calls received from PSTN 112. This would allow the base stations to provide page information for incoming telephone calls that were not completed to radios 105–108. For example, if a caller uses telephone 111 to call radio 108 while the radio is off or out-of-range, then system 10 can configure a page in page queue 118 having the ANI information as the page message. The telephone number information would be sent to radio 108 when it checks back into a cell on system 10.

Although the present invention and its advantages have been described in detail in the example system described herein, it should be understood that various changes, substitutions and alterations can be made herein without departing from the spirit and scope of the invention as defined by the appended claims.

What is claimed is:

1. A radio communication system in which a plurality of radios communicate via one or more cells, said system comprising:

means for determining when a called radio does not respond to an incoming call; and means for automatically creating a page for said called radio if said called radio does not respond to said incoming call, wherein said page comprises information related to said incoming call;

wherein said called radio is one of a group of called radios and said incoming call is directed to said group of radios, and wherein said page comprises information identifying said incoming call as a group call.

2. The system of claim 1 further comprising:

a memory comprising a list of page messages for one or more called radios, wherein said page messages may be automatically created when said called radios do not respond to said incoming call.

3. The system of claim 1 further comprising:

means for sending a caller identification to said means for automatically creating a page.

4. The system of claim 1 further comprising:

means for identifying a current checked-in cell for a called radio when the called radio checks-in to the system, wherein the called radio is one of the group of called radios that did not respond to an incoming group call; and means for routing call information from a calling radio cell to said called radio current checked-in cell.

5. The system of claim 4 further comprising:

base station interconnection means for exchanging data among said base stations.

6. The system of claim 4 further comprising:

means for sending a call set up message to said called radio; and means for detecting a call set up response from said called radio.

7. The system of claim 6 further comprising:

means for sending said page message to said called radio when said called radio checks in with one of said cells.

8. A method for converting calls to pages in a radio communication system having at least one cell, comprising the steps of:

providing call set up information related to an incoming call to a current checked-in cell for a called radio;

sending an initial call set up message from said current checked-in cell to said called radio;

determining whether said called radio is responding to said initial call set up message; and creating a page message for said called radio if said called radio is not responding to said initial call set up message, wherein said page comprises information related to said incoming call, wherein said called radio is one of a group of called radios and wherein an incoming call is directed to said group of radios, said creating step including:

creating said page message so that said message comprises information identifying said incoming call as a group call.

9. The method of claim 8 further comprising the step of:

storing a list of page messages for one or more called radios in a memory.

10. The method of claim 8 further comprising the step of:

storing said page on a base station for a home cell of said called radio.

11. The method of claim 8 wherein said call set up information comprises data which identifies a calling radio; and wherein said current checked-in cell performs said page creating step.

12. The method of claim 8 further comprising the step of:

notifying a calling radio if said called radio is not responding to said initial call set up message, wherein said notifying step provides a notification to a calling radio; and wherein said calling radio performs said page creating step.

13. The method of claim 8 further comprising the step of:

notifying a calling radio if said called radio is not responding to said initial call set up message, wherein said notifying step provides a notification to a originating cell for a calling radio; and wherein said originating cell performs said page creating step.

14. A method for converting calls to pages in a radio communication system having at least one cell, comprising the steps of:

providing call set up information related to an incoming call to a current checked-in cell for a called radio;

sending an initial call set up message from said current checked-in cell to said called radio;

determining whether said called radio is responding to said initial call set up message; and creating a page message for said called radio if said called radio is not responding to said initial call set up message, wherein said page comprises information related to said incoming call, wherein said called radio is one of a group of called radios and wherein an incoming call is directed to said group of radios, said creating step including:

creating said page message so that said message comprises information identifying a calling radio that initiated said incoming call.

15. The method of claim 14 further comprising the step of:

storing said page on a base station for a home cell of said called radio.

16. The method of claim 14 wherein said call set up information comprises data which identifies a calling radio; and wherein said current checked-in cell performs said page creating step.

17. The method of claim 14 further comprising the step of:

notifying a calling radio if said called radio is not responding to said initial call set up message.

18. The method of claim 14 further comprising the step of:

storing a list of page messages for one or more called radios in a memory.

19. A base station for a radio communication system comprising:

a receiver and a transmitter in radio communication with one or more radios;

a memory having a list of radios that are currently checked-in with said base station;

a memory having a table for tracking a current cell for radios that are assigned to said base station;

a processor coupled to said receiver, said transmitter and said memories, said processor capable of determining the current checked-in cell for a called radio, and operable to transmit group call set up messages to said called radio, wherein said called radio is one of a group of called radios; and a memory comprising a list of page messages for said one or more radios, wherein said page messages may be automatically created by said processor to comprise information related to an incoming group call when a called radio that is one of said group of called radios does not respond to one of said group call set up messages, wherein said page messages comprise information identifying said incoming call as a group call.

20. The base station of claim 19 further comprising:

a communication link coupled between said base station and one or more other base stations.

21. The base station of claim 20 wherein said communication link is capable of carrying both voice and data signals.

22. The base station of claim 21 wherein said processor is capable of exchanging call set up information with said other base stations via said communication link.

23. A method of automatically converting, calls to pages in a radio communication system having a plurality of interlinked base stations, each of said base stations representing a separate cell said method comprising the steps of:

receiving an initial call message related to an incoming call at an originating base station;

determining whether a called radio is checked-in to said originating base station:

if said called radio is checked-in with said originating base station, then sending a call set up message to said called radio;

if said called radio is not checked-in with said originating base station, then identifying a current base station for said called radio, and sending said initial call message to said current base station; and sending said call set up message to said called radio;

determining whether said called radio is responding to said call set up message; and if said called radio is not responding to said call set up message, then automatically creating a page message for said called radio, wherein said page comprises information related to said incoming call;

wherein a calling radio initiates a group call to a particular group, and wherein said called radio is a member of said particular group.

24. The method of claim 23 wherein said page message identifies said particular group.

25. The method of claim 23 wherein said initial call message corresponds to a call originating from a publicly switched telephone network (PSTN) coupled to said originating base station; and wherein said page message comprises automatic number identification information received from the PSTN.

26. The method of claim 23 further comprising the steps of:

sending a source identifier for a calling radio to said current base station; and using said source identifier to configure said page message.

27. The method of claim 26 wherein said current base station configures said page message.

28. The method of claim 23 further comprising the steps of:

delivering said page message to said called radio when said called radio checks in with one of said base stations.

* * * * *